(12) United States Patent
Stopiński et al.

(10) Patent No.: US 11,183,084 B2
(45) Date of Patent: Nov. 23, 2021

(54) PORTABLE DATA STACK HOLDER

(71) Applicants: Wojciech Stopiński, Warsaw (PL); Paulina Gajos-Stopińska, Warsaw (PL)

(72) Inventors: Wojciech Stopiński, Warsaw (PL); Paulina Gajos-Stopińska, Warsaw (PL)

( * ) Notice: Subject to any disclaimer, the term of this patent is extended or adjusted under 35 U.S.C. 154(b) by 0 days.

(21) Appl. No.: 17/336,364

(22) Filed: Jun. 2, 2021

(65) Prior Publication Data

US 2021/0287574 A1    Sep. 16, 2021

Related U.S. Application Data

(63) Continuation of application No. PCT/EP2020/059471, filed on Apr. 2, 2020.

(51) Int. Cl.
  *G09C 5/00*    (2006.01)
  *H04L 9/38*    (2006.01)

(52) U.S. Cl.
  CPC .    *G09C 5/00* (2013.01); *H04L 9/38* (2013.01)

(58) Field of Classification Search
  CPC .................................. G09C 5/00; H04L 9/38
  USPC ........................................................ 380/56
  See application file for complete search history.

(56) References Cited

U.S. PATENT DOCUMENTS

| | | | | |
|---|---|---|---|---|
| 1,956,384 A | * | 4/1934 | Gentet | G09C 1/04 380/56 |
| 2,293,232 A | * | 8/1942 | Weller | G09C 1/04 380/57 |
| 6,055,635 A | * | 4/2000 | Karlsson | G09C 1/00 380/26 |
| 2009/0080652 A1 | * | 3/2009 | Harding | G06F 21/46 380/56 |

FOREIGN PATENT DOCUMENTS

| | | |
|---|---|---|
| DE | 202013002454 | 5/2013 |
| WO | WO2015/128859 | 9/2015 |

OTHER PUBLICATIONS

International Search Report for PCT Application No. PCT/EP2020/059471 dated Jul. 27, 2020.
Office Action for GB Application No. GB1904692.9 dated Oct. 4, 2019.

(Continued)

*Primary Examiner* — Michael S McNally
(74) *Attorney, Agent, or Firm* — Pearl Cohen Zedek Latzer Baratz LLP

(57) ABSTRACT

A data storage device includes a plurality of tiles whose faces are marked with characters. An elongated core is configured to enable slots of the tiles to fit over an openable end of the core to mount the tiles on the core with the marked faces aligned and to slide along the core. The length of the core is sufficient such that tiles of a mounted stack of tiles are slidable away from other tiles of the stack to form a gap that is sufficient to enable reading the character on the tile. A locking element is placeable on the openable end to prevent removal of tiles from the stack, and removable to enable addition of tiles or removal of tiles. A casing is closable over the core and includes a limiting structure to limit sliding of the tiles when the casing is closed.

20 Claims, 5 Drawing Sheets

(56) References Cited

OTHER PUBLICATIONS https://www.amazon.com/Billfodl-Private-Key-Backup/dp/B07BS632RR/ref=sr_1_2_sspa?crid=3JOYDPJZTLKD9&dchild=1&keywords=steel+bitcoin+wallet+for+hardware+wallet+backup+-+cold+wallet+backup&qid=1621959882&sprefix=steel+bitcoin+wallet+for+hardware+wallet+backup%2Caps%2C258&sr=8-2-spons&psc=1&smId=A22SCTTPKFDO1S&spLa=ZW5jcnlwdGVkUXVhbGlmaWVyPUEzSFhLUjdLQ0U3WjRIJmVuY3J5cHRlZElkPUEwMTQxNzY5MTc5UzZVTzFNUEpVTyZlbmNyeXB0ZWRBZElkPUEwNzl4Mzc1MzQ0S1JVSVU1OUtPTiZ3aWRnZXROYW1lPXNwX2F0ZiZhY3Rpb249Y2xpY2tSZWRpcmVjdCZkb05vdExvZ0NsaWNrPXRydWU=Amazon 2021 Steel Bitcoin Wallet for Hardware Wallet Backup—Cold Wallet Backup compatible with Trezor One, Ledger Nano S and KeepKey hardware wallet (double) Amazon.com See product description. Retrieved on May 26, 2021.

\* cited by examiner

PORTABLE DATA STACK HOLDER

CROSS REFERENCE TO RELATED APPLICATIONS

The present application is a U.S. Patent Continuation application of International Patent Application PCT/EP2020/059471, filed Apr. 2, 2020, claiming priority form G.B. Patent application No. 1904692,9, filed Apr. 3, 2019, all of which are hereby incorporated in their entirety by reference.

FIELD OF THE INVENTION

The present invention relates to securing data. More particularly, the present invention relates to a portable holder for a data stack.

BACKGROUND OF THE INVENTION

Users of various devices and applications, in particular users of cryptocurrencies, occasionally are required to refer to sensitive data in the form of a password, security seed phrase, or another string of characters or symbols in order to provide access to information in order to review or manipulate the information. Failure to provide the sensitive data in a timely manner, or access to the sensitive data by an unauthorized person or device, could lead to financial or other damage to the user.

Often, do to the length of the sensitive data, or to the number of such sets of sensitive data which are associated with a single user, a user may not be able to reliably memorize or recall the sensitive data when required. On the other hand, if the data is recorded for later recall, the record of the data could be subject to loss, destruction, or unauthorized access.

SUMMARY OF THE INVENTION

There is thus provided, in accordance with an embodiment of the present invention, a data storage device including: a plurality of tiles, a face of each tile marked with a character of a set of characters, each tile including a slot; an elongated core, a cross section of the core configured to enable a slot of each of the tiles to fit over an openable end of the core to mount that tile on the core, with the marked face of that tile aligned with the face of an adjacent tile that is mounted on the core, and to enable the tile to slide along the core, a length of the core being sufficient such that when a stack of a predetermined maximum number of the tiles is mounted on the core, some of the tiles of the stack are slidable away from other tiles of the stack to form a gap that is sufficiently long to enable reading the character that is marked on that tile; a locking element that is placeable on the openable end to prevent removal of a tile of the plurality of tiles from the stack, and removable from the openable end to enable addition of a tile of the plurality of tiles to the stack or removal of a tile of the plurality of tiles from the stack; and a casing that is closable over the core and that includes a limiting structure to limit sliding of the tiles along the core when the casing is closed over the core.

Furthermore, in accordance with an embodiment of the present invention, the character is indelibly marked on the face of the tile.

Furthermore, in accordance with an embodiment of the present invention, the character is engraved on the face of the tile.

Furthermore, in accordance with an embodiment of the present invention, the slot of each tile and the cross section of the core are noncircular.

Furthermore, in accordance with an embodiment of the present invention, the core includes a single bar.

Furthermore, in accordance with an embodiment of the present invention, the core includes a plurality of prongs.

Furthermore, in accordance with an embodiment of the present invention, each tile of the plurality of tiles is shaped so as to enable mounting of different stacks of the tiles on different prongs of the plurality of prongs.

Furthermore, in accordance with an embodiment of the present invention, the core includes two prongs and each tile is substantially semicircular.

Furthermore, in accordance with an embodiment of the present invention, the slot of each tile is located at a center of the face of that tile.

Furthermore, in accordance with an embodiment of the present invention, the slot of each tile is located eccentrically on the face of that tile.

Furthermore, in accordance with an embodiment of the present invention, one end the core that is opposite the openable end is widened at to prevent the tiles from sliding off the one end.

Furthermore, in accordance with an embodiment of the present invention, the locking element includes a cap into which the openable end is insertable.

Furthermore, in accordance with an embodiment of the present invention, the openable end includes a notch.

Furthermore, in accordance with an embodiment of the present invention, the cap includes a bore such that when the openable end is inserted into that cap such that the notch is aligned with the bore, a screw is insertable into the bore to hold the core to the cap.

Furthermore, in accordance with an embodiment of the present invention, the locking element includes an end lock, a slot of the end lock being placeable on and removable from the openable end.

Furthermore, in accordance with an embodiment of the present invention, the openable end includes a slit over which the slotted lock is placeable.

Furthermore, in accordance with an embodiment of the present invention, the limiting structure includes a constriction.

Furthermore, in accordance with an embodiment of the present invention, the limiting structure includes a spring.

Furthermore, in accordance with an embodiment of the present invention, the core includes markings.

Furthermore, in accordance with an embodiment of the present invention, the character includes at least one marking selected from a group of types of markings consisting of alphanumeric characters, pictographs, symbols, punctuation marks and diacritical marks.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
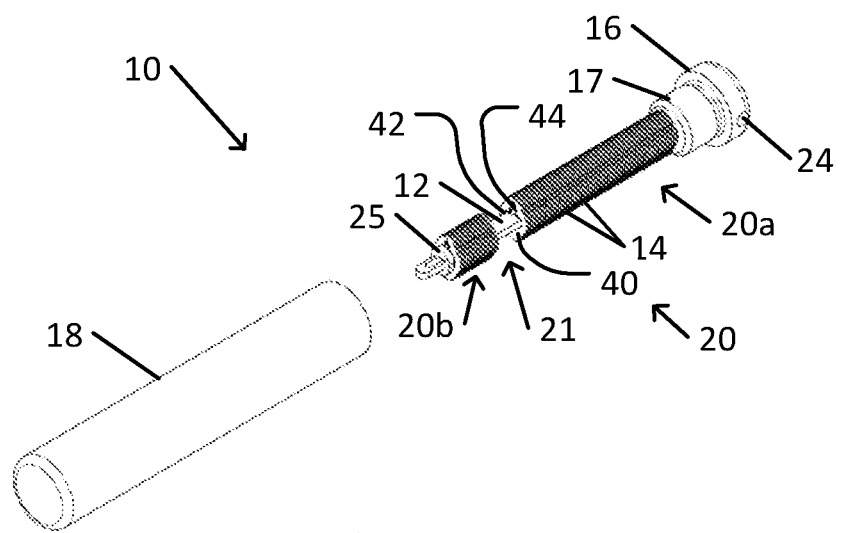
FIG. 1 schematically illustrates an example, of a portable data stack holder.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In accordance with an embodiment of the present invention, a portable data stack holder is configured to hold a stack of tiles that represents a string of characters. Typically, the string of characters represents sensitive data, such as a password, private key, security seed phrase, or other data that is at least under some circumstances needed to access a system or device, or to recall data. As used herein, a character may include one or more an alphanumeric characters, pictographs, symbols, punctuation marks, diacritical marks, or other type of marking that may be arranged to represent data. In some cases, the character may include a combination of two or more such markings of one or more types of markings. The set of characters may be selected for different populations (e.g., speakers or readers of different languages, or other different populations).

Each tile includes at least one face on which is marked, typically indelibly, with one or more characters from a set of characters. For example, the character may be engraved, deposited, or otherwise indelibly marked on the tile. As used herein, indelible marking refers to marking that cannot be erased without destroying the tile, or by abrading the tile to remove material from the tile itself (e.g., as opposed to removing only a layer of paint or coloring that is applied to the surface of tile). In some cases, each tile may be thin (having a thickness that is no greater than one tenth that a representative lateral dimension, e.g., diameter or width). In other cases, the tiles may have substantial thickness. In some cases, the tiles may be flat. In other cases, the tiles, may have curved or bent surfaces (e.g., with substantially identical contours to enable nesting of tiles within a stack), or may be otherwise shaped.

The tiles are typically constructed of a rigid and durable material such that they do not bend when used for storing sensitive data as described herein. For example, the tiles may be constructed of a material such as a metal, rigid plastic, ceramic, glass, stone, wood, or other material that is not expected to bend or disintegrate during normal use.

The engraved tiles are mounted in order on an elongated core, e.g., with all of the characters facing a common direction. For example, each engraved tile may have a slot or opening that is configured to fit over the elongated core and to enable the tile to slide along the core. A user may access the sensitive data by reading the engraved character on each tile of the stack. The core is sufficiently long such that after a reading an exposed tile at one end of the stack, the read tile may be slid along the core so as to expose the next tile of the stack. The user may continue to read and slide tiles of stack until all of the tiles in the stack have been read. When the user is not reading or arranging the tiles, the core and stack may be closed inside a protective casing.

In some cases, a noncircular cross-sectional shape of the core and corresponding noncircular shapes of the slots on the tiles may prevent unwanted rotation of the tiles about the core. Where rotation is prevented, the characters on all tiles may be viewed as erect as long as the core is oriented such that character on one tile is viewed as erect. Thus, in order to read the stack, the user may simply slide each tile of the stack along the core to successively read each tile of the stack.

The slot on each tile may be located at an off-center position. The off-center position may provide more available space for a character than when the slot is centered. Increasing the available space may enable engraving of characters that are larger, and are thus more readily visible, than would be possible with a centered slot. In some cases, a non-centered circular slot on a core with a circular cross section may enable viewing each tile by rotation of the tile about the core, as an alternative or in addition to sliding tiles along the core.

In some cases, a shape of the slot may be determined by a method of production of the tiles. For example, a slot may be shaped so as to facilitate production by a particular type of machine or manufacturing facility.

Each end of the elongated core includes holding structure to prevent tiles from accidentally sliding or falling off of the end of the core. At one or both ends of the core, the holding structure is a removable locking structure to enable mounting of tiles onto the core, or deliberate removal of tiles from the core. At other times, a locking mechanism, e.g., in the form of a screw or other mechanism, may be applied to prevent accidental or unintentional removal of the locking structure.

For example, the holding structure at one end of the core may include a widening of the core to prevent a disk from sliding off of the core at that end. An opposite end of the core may be configured to enable attachment of a locking structure in the form of a removable cap. For example, the end for attachment of the cap may include a hole or notch through which a locking screw may be inserted. When the cap is removed from the core, tiles may be mounted onto, or removed from, that end of the core. When the cap is placed onto the core, a locking screw, pin, or other locking component may be inserted into a hole in the cap, and through the hole or notch at the end of the core. Rotation and tightening of the screw may cause threading of the screw to engage threading in the hole of the cap to hold the screw in place. For example, the screw may not be removable without use of a specialized screwdriver or wrench (e.g., an Allen wrench or hexagonal screwdriver).

In another example, one end of the core may be attached to a cap (e.g., that is not designed for easy removal by a user), while locking structure at the opposite end may include a locking nut that may be rotated to an open orientation to enable removal of the locking nut from the core, and rotatable to a closed orientation (e.g., at 90° to the open orientation) to prevent removal of the locking nut, and thus of the tiles, from the core.

When all of the engraved tiles have been mounted on the elongated core and the cap has been locked into place, the stack assembly may be inserted into a casing. For example, male threading on the cap may be screwed into female threading on the casing to secure the stack assembly inside the casing.

The casing includes limiting structure to limit sliding of the tiles along the core when placed in the casing. For example, the limiting structure may include an internal shoulder or constriction past which the tiles are prevented from sliding. The constriction may be positioned such that when the stack consists of the maximum allowable number of tiles, all sliding is prevented. Alternatively or in addition, the limiting structure may include a spring that may press against the tiles to prevent sliding also when the number of tiles is less than the maximum.

Use of a portable data stack holder as described herein may be advantageous over other methods of storing sensitive data. Stacking tiles on a core may be done privately, without the intervention or assistance of an outside party. Typically, no specialized tools or equipment are required to enable storing or reading the data. The tiles and other components of the portable data stack holder may be durable against destruction or corruption under a wide variety of conditions (e.g., meteorological or environmental conditions, immersion in many types of liquids, heat or fire, exposure to light or other irradiation, exposure to electric shock or magnetic fields, dropping or impact, rubbing, or other conditions that could be destructive of paper, electromagnetic, electronic, or other data storage). Due to its heft and bulk, the portable data stack holder may be less likely to be misplaced than a piece of paper or flash drive. Since the data tiles are arranged in a stack in which only one tile is visible at a time, the entire string of characters cannot be copied by simply photographing the core and tiles when they are exposed. The data cannot be accessed via unauthorized access to a computer, smartphone, or other data storage, communications, or computing device, or to a network that is in communication with such a device. The data need not be entrusted to with a third party (as with some password storage services).

FIG. 1 schematically illustrates an example, of a portable data stack holder.

Portable data stack holder 10 is configured to enable storing a plurality of character tiles 14 on a stack core 12. Character tiles 14 are arranged in a tile stack 20 on stack core 12. Character tiles 14 are oriented within tile stack 20 such that faces 40 of character tiles 14 are aligned with one another. Therefore, when two adjacent character tiles 14 a slid so as to abut one another, character 44 on face 40 of one character tile 14 may be covered by the adjacent character tile 14. In the example shown, a distal part 20b of tile stack 20 (e.g., in the example shown, distal to cap 16 on stack core 12) has been slid away from a proximal part 20a of tile stack 20 to form a gap 21 between distal part 20b and proximal part 20a. Stack core 12 is exposed within gap 21 between distal part 20b and proximal part 20a. A length of stack core 12 is sufficient such that when stack 20 includes a predetermined maximum number (e.g., 100 or another maximum number) of character tiles 14, a part of stack 20 may be slid away from another part (e.g., distal part 20b from proximal part 20a) to form a gap 21 that is sufficiently long to enable a user to read an exposed character 44 on a character tile 14 that is adjacent to gap 21. For example, a minimum length of gap 21 may be designed to be at least 1 cm.

For the sake of convenience and clarity, an end of stack core 12 that is closest to cap 16 is herein referred to as the proximal end, since it is assumed that in many cases, a user will hold and handle stack core 12 by grasping cap 16. Similarly, the end of stack core 12 that is most distant from cap 16 is referred to herein as the distal end.

Stack core 12 is in the form of a single elongated bar or rod that is constructed of a rigid and durable material. The shape of a cross section of stack core 12 typically may be noncircular (but may be circular in some examples). The material and design of stack core 12 may be selected to be resistant to shattering, twisting or bending, warping, corrosion, melting, or other changes to the shape or structural integrity of stack core 12. For example, a suitable material may include stainless steel, brass, or another suitable metallic or nonmetallic material of sufficient thickness (e.g., greater than one millimeter) so as to provide a predetermined sufficient rigidity and durability to stack core 12. Stack core 12 may be sufficiently long so as to accommodate a predetermined maximum number of character tiles 14 (e.g., 100, or another number) and a gap between two stacks of tiles, while being sufficiently short (e.g., less than 10 cm) so as to be easily transportable, e.g., in a pocket or purse.

Each character tile 14 is in the form of a thin (e.g., less than one millimeter, e.g., about 0.5 mm) plate with two opposite faces (e.g., with a diameter or other representative lateral dimension on the order of one centimeter, in the range of 7 mm to 2 cm). Each character tile 14 is formed of a material that is sufficiently rigid and durable to as to retain its shape during normal use (e.g., mounting on stack core 12, removal from stack core 12, sliding along stack core 12). Character tile 14 includes at least one slot 42 that is configured to fit over stack core 12. A shape and dimensions of slot 42 may be selected so as to not impede sliding of each character tile 14 along stack core 12 by a user of portable data stack holder 10. As in the example shown, the cross section of stack core 12 and the form of slot 42 may be selected (e.g., noncircular) so as to impede unwanted rotation of character tiles 14 about stack core 12. In the example shown, slot 42 is located at the center of character tile 14, and stack core 12 extends from the center of cap 16.

In the example shown, character tiles 14 have an elongated curved shape, and the cross-sectional shape of casing 18 is circular. In other examples, character tiles 14 and casing 18 may have other shapes (e.g., round, rectangular, polygonal, oval, irregular, or other shapes).

At least one face of each character tile 14 is indelibly marked (e.g., by engraving, electroplating, machining, inlay, or otherwise) with a character 44. In some examples, the form of character 44 may be raised or depressed relative to the remainder of the surface of character tile 14, e.g., to enable tactile recognition of character 44. The marking may change the color or texture of character 44 relative to the remainder of the surface of character tile 14 so as to facilitate visual recognition of character 44 under a variety of lighting conditions. In some examples, a colored character 44 may be accompanied by a separate tactile marking (e.g., braille characters). In some examples, each character tile 14 may be marked with different characters on opposite faces of character tile 14.

In the example shown, character tiles 14 may be slid one at a time along stack core 12 across gap 21 from distal part 20b of tile stack 20 to proximal part 20a. As each character tile 14 is slid from distal part 20b to proximal part 20a, the character 44 on that character tile 14 becomes visible and may be read (or felt). Therefore, if characters 44 on character tiles 14 have been arranged in an order that represents a set of sensitive data, each character 44 (or an equivalent that is indicated by character 44) may be entered as it is read into a secure system to enable access to that system.

In the example shown, when portable data stack holder 10 is not being modified or read, casing 18 may be closed over stack core 12 and tile stack 20. For example, casing 18 may include female threading 34 (shown in FIG. 4) that is configured to engage male threading 17 on cap 16 to secure casing 18 to stack core 12. Other attachment or locking mechanisms may be used to attach casing 18 to stack core 12. For example, casing 18, cap 16, or both may include a friction surface (e.g., rubber, soft plastic, or roughening) or gasket to hold casing 18 onto cap 16. Latches, pins, or other locking mechanisms may be used. In some examples, casing 18 may include a clip, chain, or other structure to securely hold portable data stack holder 10 within a pocket, purse, case, or elsewhere.

In the example shown, casing 18 has a shape of a circular cylinder. In other examples, the cross section may not be circular, with ends that are flat, rounded, tapered, or otherwise shaped, and with an outer surface that includes ridges, bosses, indentations, or other patterning.

Stack core 12 includes tile holding structure that is configured to be opened to enable arrangement or rearrangement of character tiles 14 on stack core 12, and to prevent removal of character tiles 14 from stack core 12 at other times.

Figure 2:
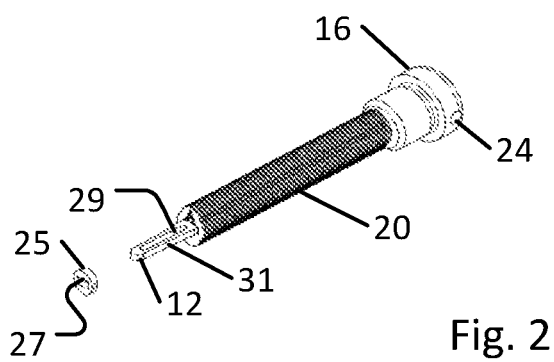
FIG. 2 schematically illustrates the portable data stack holder of FIG. 1 when opened.

FIG. 2 schematically illustrates the portable data stack holder of FIG. 1 when opened.

In the example shown, the distal end of stack core 12 includes widening 31 on either side of slit 29. Locking structure includes end lock 25 with locking slot 27. Locking slot 27 is elongated such that when end lock 25 is in an orientation in which the elongated dimension of locking slot 27 is parallel to the plane of widening 31 (as shown in FIG. 2), end lock 25 may be slid onto the distal end of stack core 12 to widening 31. Resilience at the distal end of stack core 12 surrounding slit 29 may enable friction between end lock 25 and widening 31 to hold end lock 25. Alternatively or in addition, a distal end of stack core 12 may include projections or other structure to hold end lock 25 onto stack core 12.

Figure 3A:
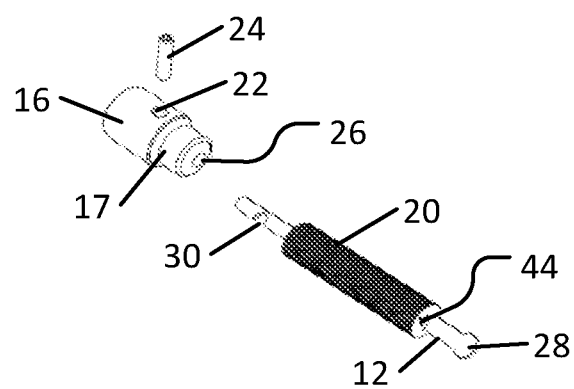
FIG. 3A schematically illustrates an alternate example of a portable data stack holder when opened.
Figure 3B:
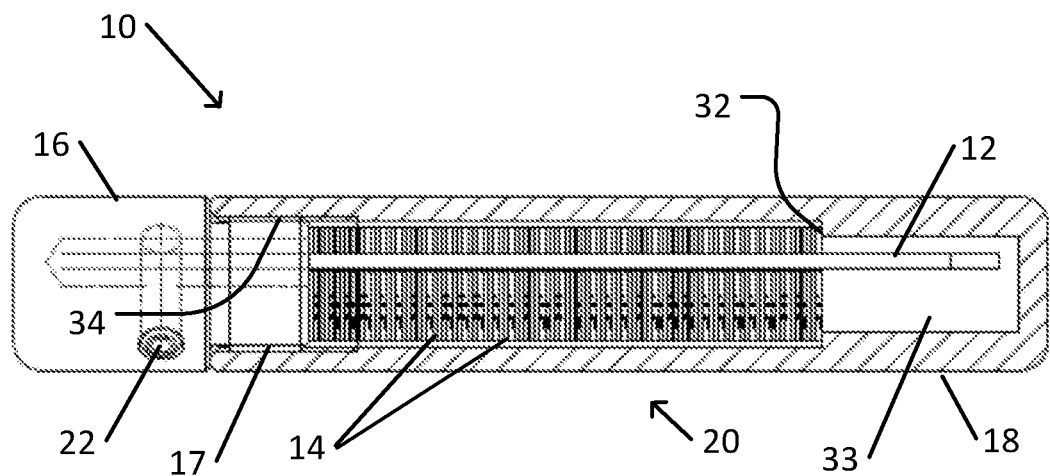
FIG. 3B is a schematic cross sectional view of the portable data stack holder shown in FIG. 3A.

FIG. 3A schematically illustrates an alternate example of a portable data stack holder when opened. FIG. 3B is a schematic cross sectional view of the portable data stack holder shown in FIG. 3A.

In this example, a distal end of stack core 12 includes integral stop 28. Integral stop 28 is shaped (e.g., is sufficiently widened, as in the example shown, or is otherwise shaped) to prevent a slot 42 of a character tile 14 from sliding past integral stop 28 and off of stack core 12.

At a proximal end of stack core 12, locking structure in the form of cap 16 is removable from stack core 12. When cap 16 is removed from stack core 12, character tiles 14 may be slide onto stack core 12 toward integral stop 28 at the distal end of stack core 12, or may be removed from stack core 12. When character tiles 14 are arranged as desired, cap 16 may be attached to stack core 12 to impede or prevent intentional or unintentional removal of character tiles 14 from stack core 12.

In the example shown, cap 16 includes bore 22 and stack core 12 includes notch 30 near its proximal end. Proximal end of stack core 12 may be inserted into opening 26 of cap 16 until notch 30 is aligned with bore 22. When notch 30 and bore 22 are aligned, locking screw 24 may be screwed into bore 22 and through notch 30. For example, male threading on locking screw 24 may engage female threading within bore 22. In other examples, the proximal end of stack core 12 may include a hole through which locking screw 24 may be inserted. Alternatively or in addition, other types of locking structure, including one or more pins, latches, or other locking structure may hold cap 16 onto stack core 12.

In the example shown, slot 42 is located eccentrically on character tile 14. The eccentric location of slot 42 may enable marking a character tile 14 with a larger character 44 than would be enabled by a centered slot 42. Similarly, opening 26 is located eccentrically on cap 16, such that stack core 12 from an off-center position on cap 16.

Figure 4:
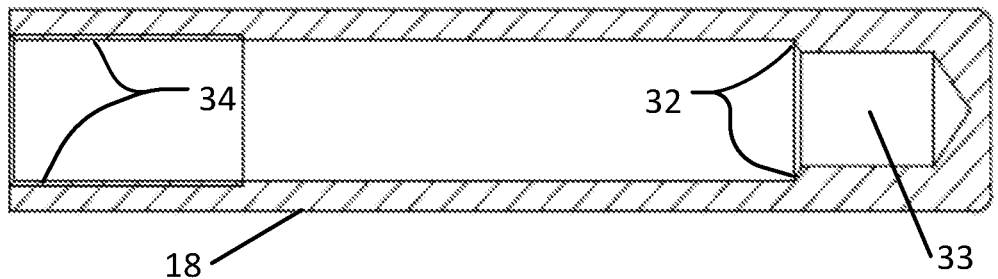
FIG. 4 is a schematic cross section of a casing of the portable data stack holder shown in FIG. 1.

FIG. 4 is a schematic cross section of a casing of the portable data stack holder shown in FIG. 1.

In the example shown, tile stack 20 of character tiles 14 is mounted on stack core 12. When, as in the example shown, casing 18 is placed over tile stack 20 on stack core 12, a limiting constriction in the form of internal shoulders 32 of casing 18 may limit sliding of character tiles 14 along stack core 12. For example, internal shoulders 32 may be located at a point within casing 18 that corresponds to a recommended maximum number of character tiles 14 in tile stack 20. Cavity 33 within casing 18 internal to internal shoulders 32 is sufficiently long and wide to accommodate the distal end of stack core 12. For example, the diameter of cavity 33 may be sufficient to accommodate rotation of a stack core 12 that extends eccentrically from cap 16 when cap 16 is screwed into, or out of, casing 18.

When sliding of character tiles 14 in tile stack 20 is limited by internal shoulders 32, portable data stack holder 10 may be handled or carried noiselessly. In some cases, limiting the sliding of character tiles 14 within casing 18 may prevent or limit possible damage to a character tile 14.

It may be noted that when the distal end of tile stack 20 does not completely extend to internal shoulders 32, sliding of character tiles 14 may be limited but not eliminated. In some cases, different casings 18 may be designed for different tile stacks 20 that include different numbers of character tiles 14 (e.g., for tile stacks 20 that correspond to common lengths of sensitive data to be stored). In some cases, a tile stack 20 may include one or more spacer tiles, on which no characters have been marked, in order to create a tile stack 20 that is of the correct length so as to extend to internal shoulders 32.

It may be noted that blank spacer tiles may have uses in addition to extending the length of a tile stack 20 to internal shoulders 32. For example, spacer tiles may be used as separators to divide a tile stack 20 into shorter subsets of character tiles 14 that each represents a different (e.g., relatively short) password or another type of sensitive data.

Figure 5:
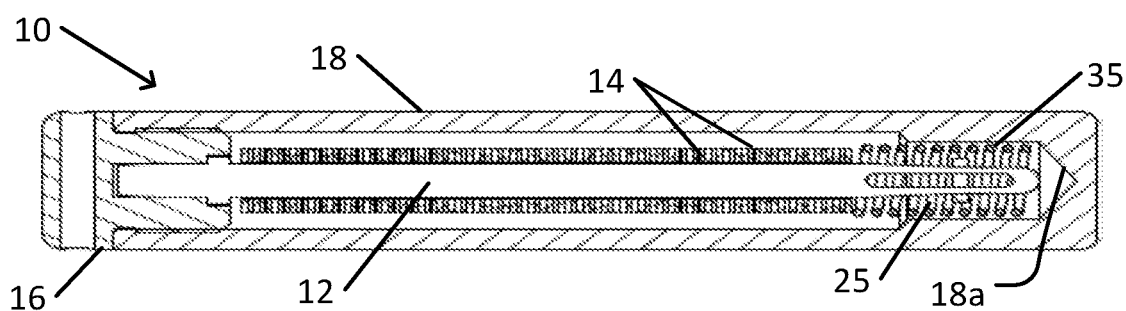
FIG. 5 is a schematic cross sectional view of an example in which a casing of a portable data stack holder includes a spring.

FIG. 5 is a schematic cross sectional view of an example in which a casing of a portable data stack holder includes a spring.

In the example shown, a limiting mechanism in the form of spring 35 is inserted into casing 18. When a stack core 12 that is holding a tile stack 20 of character tiles 14 is inserted into casing 18, spring 35 may be compressed between a distal end of tile stack 20 and distal casing wall 18*a*. The distance through which spring 35 is compressed may depend on the length of tile stack 20, determined by the number of character tiles 14 in tile stack 20. The force that is exerted by spring 35 when compressed on tile stack 20 may prevent sliding of character tiles 14 in tile stack 20. The variable length of spring 35 may enable prevention of sliding in tile stacks 20 having a range of different lengths. Alternatively or in addition to a spring 35, a casing 18 may include another type of compressible and resilient element, e.g., an elongated cylinder or block of a resilient compressible material (e.g., plastic foam, synthetic sponge, or other compressible resilient object).

Figure 6A:
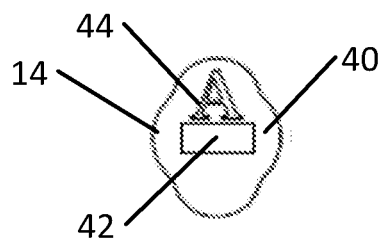
FIG. 6A schematically illustrates an example of a character tile of a portable data stack holder.

FIG. 6A schematically illustrates an example of a character tile of a portable data stack holder.

In the example shown, character tile 14 is noncircular, and slot 42 is located at the center of character tile 14.

Figure 6B:
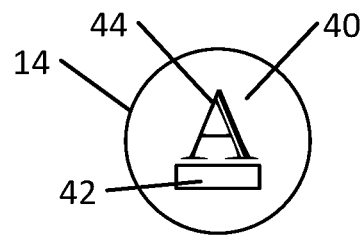
FIG. 6B schematically illustrates another example of a character tile.

FIG. 6B schematically illustrates another example of a character tile.

In the example shown, slot 42 is located eccentrically on face 40 of character tile 14. Character 44 is marked on a part of face 40 that is above (e.g., when character tile 14 is held such that character 44 is upright) slot 42. Therefore, the space available for marking of character 44 is larger than the space that would be available if slot 42 were to be located along the center (the horizontal diameter of, in the example shown) of face 40.

In the example shown, face 40 of character tile 14 is circular. Other shapes are possible.

Figure 6C:
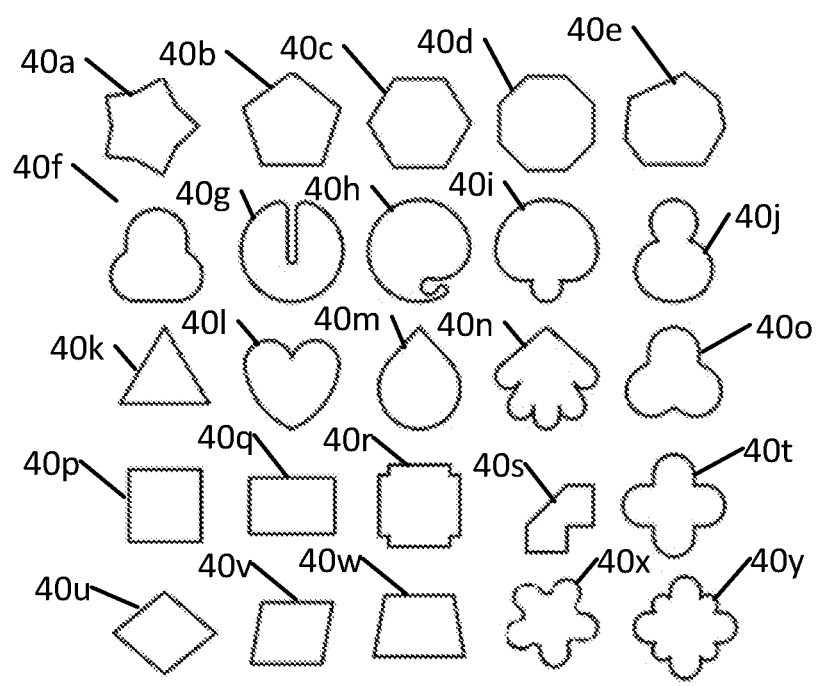
FIG. 6C schematically illustrates examples of alternative shapes of a face of character tile of a portable data stack holder.

FIG. 6C schematically illustrates examples of alternative shapes of a face of character tile of a portable data stack holder.

Face shapes 40*a* to 40*y* illustrate examples of various shapes exhibiting various degrees of rotational or reflectional symmetry, or lack of symmetry. Other shapes of face 40 may be used. An interior of a casing 18 may be shaped and sized to accommodate a stack of character tiles 14 with any of face shapes 40*a* to 40*y*. In some cases, different face shapes with similar outer contours (e.g., face shapes 40*g* and 40*h*, or 40*p* and 40*r*) may be used together and enclosed in a single casing 18.

Similarly, various shapes of slot 42 may be possible. A cross-sectional shape of stack core 12 may be shaped to match the shape of slot 42.

Figure 7:
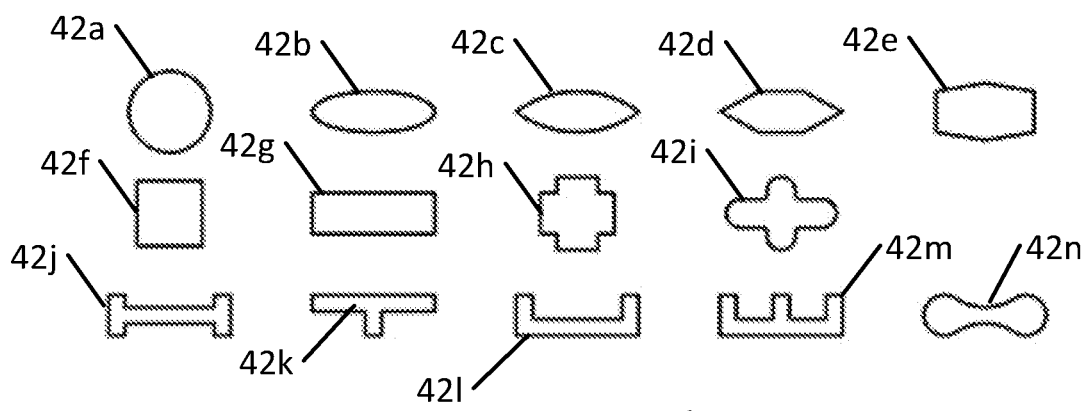
FIG. 7 schematically illustrates examples of alternative shapes of a slot on a character tile of a portable data stack holder.

FIG. 7 schematically illustrates examples of alternative shapes of a slot on a character tile of a portable data stack holder.

Slot shapes 42*a* to 42*n* illustrate examples of shapes of a slot 42 in a character tile 14. A character tile 14 with a slot 42 having one of slot shapes 42*a* to 42*n* is typically designed for mounting on a stack core 12 having a similar cross section. In some cases, e.g., slot shapes 42*j* to 42*n*, slot 42 may be designed for mounting on a stack core 12 that consists of two or more prongs.

Of the illustrated examples, slot shape 42*a* is circular. Thus, if a character tile 14 is mounted on a stack core 12 having a similarly round cross section, that character tile 14 may be freely rotated about stack core 12. The remaining slot shapes 42*b* to 42*n* are non-circular. Therefore, a character tile 14 with a slot 42 having one of slot shapes 42*a* to 42*n* and mounted on a stack core 12 having a similar shape (e.g., either formed by a single piece or by multiple prongs) cannot be rotated about stack core 12.

In all of the examples shown of slot shapes 42*a* to 42*n*, right-left reflectional symmetry of slot 42 and of stack core 12 allow mounting of a character tile 14 on stack core 12 with either face 40 facing distally or proximally. Shapes with additional vertical reflectional symmetry (e.g., slot shapes 42*a*-42*j* and 42*n*), or fourfold rotational symmetry (e.g., slot shapes 42*f* and 42*h*), and depending on the location of slot 42 on face 40, could allow for mounting of character tiles 14 on stack core 12 such that characters 44 on different character tiles 14 are oriented differently.

Figure 8A:
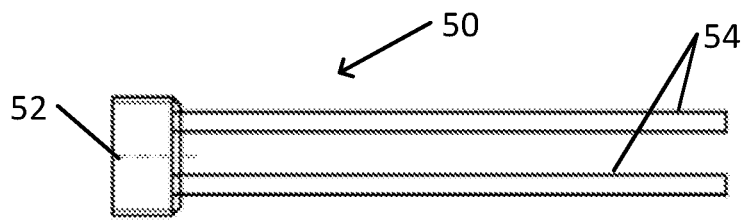
FIG. 8A schematically illustrates an example of a stack core of a portable data stack holder, the core having two prongs.
Figure 8B:
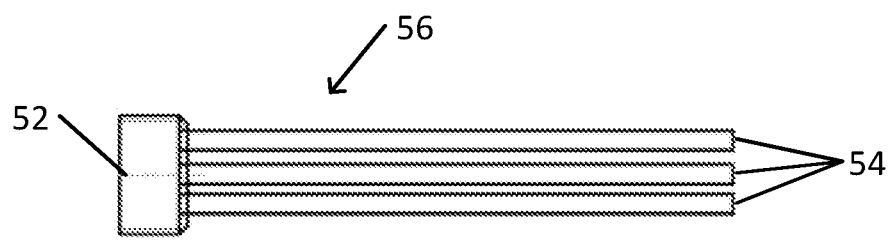
FIG. 8B schematically illustrates a variant of a stack core of a portable data stack holder, the core having three prongs.

FIG. 8A schematically illustrates an example of a stack core of a portable data stack holder, the core having two prongs. FIG. 8B schematically illustrates a variant of a stack core of a portable data stack holder, the core having three prongs.

In the example shown, two-pronged stack core 50 includes two prongs 54 that extend distally from cap 52. Each prong 54 may have a cross-sectional shape that is configured to fit into a slot 42 of a character tile 14. For example, a two-pronged stack core 50 having two prongs 54 with round cross sections may be designed for use with a slot 42 having a slot shape 42*n*, or a pair of slots 42 each with a slot shape 42*a*. Two prongs 54 having rectangular cross sections may be designed for use with a slot 42 having a slot shape 42*j* or 42*l*, or with two slots each having a slot shape 42*g*. Prongs 54 may have otherwise shaped cross sections, e.g., designed for use with slots 42 that are otherwise shaped.

Three-pronged stack core 56 includes three prongs 54 that extend distally from cap 52. For example, a three-pronged stack core 56 having prongs 54 with round cross sections may be designed for use with a slot 42 having three of slots 42 each with a slot shape 42*a*. Prongs 54 having rectangular cross sections may be designed for use with a slot 42 having a slot shape 42*k* or 42*m*, or with three slots each having a slot shape 42*g*. Prongs 54 may have otherwise shaped cross sections, e.g., designed for use with slots 42 that are otherwise shaped.

Figure 8C:
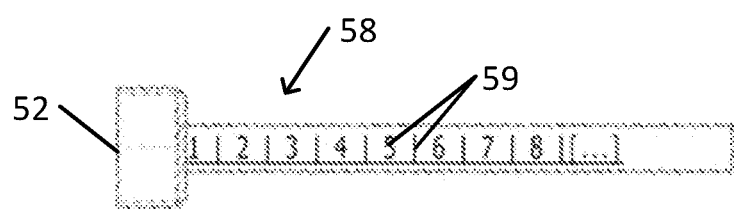
FIG. 8C schematically illustrates a stack core that includes markings.

FIG. 8C schematically illustrates a stack core that includes markings.

In the example shown, marked stack core 58 includes length markings 59. For example, length markings 59 may be marked in units that facilitate counting a number of character tiles 14 that are present in a tile stack 20 on marked stack core 58. In other cases, marked stack core 58 may be otherwise marked, e.g., by a manufacturer or by a user of marked stack core 58. For example, the markings may include characters, coloring, or other marking. In some cases, the markings may be configured to be visible only under specified conditions.

In some cases, multiple portable data stack holders may be connected together.

Figure 9:
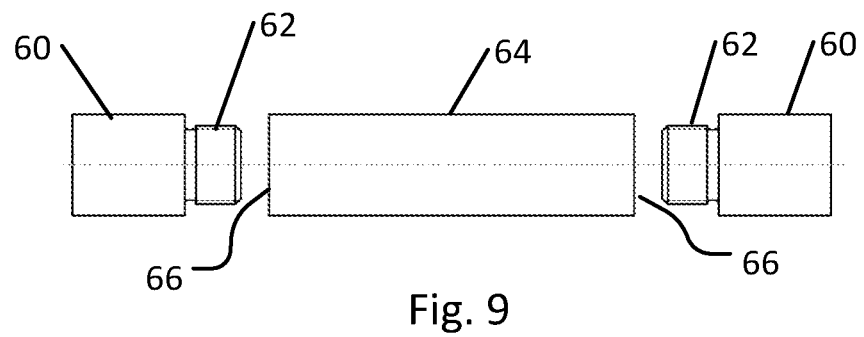
FIG. 9 schematically illustrates examples of portable data stack holders that are configured to connect to one another.

FIG. 9 schematically illustrates examples of portable data stack holders that are configured to connect to one another.

In the example shown, casing 60 includes male cap 62 with male threading on its outer surface. Casing 64 has at least one female cap 66 with a cavity having female threading on its inner surface. In this example, male cap 62 may be threaded into female cap 66 in order to attach casing 60 (e.g., enclosing a stack core 12 holding a tile stack 20) to casing 64 (e.g., also enclosing a stack core 12 holding a different tile stack 20). After such end-to-end coaxial attachment, casing 60 and casing 64 may be carried or stored as a single unit (e.g., increasing ease of handling or reducing the likelihood of loss).

In the example shown, where each end of casing 64 is provided with a female cap 66, two casings 60 with male caps 62 may be attached to opposite ends of casing 64. In other examples, a casing may be provided with a male cap 62 at one end, and a female cap 66 at the other end. In some cases, a kit that is provided to a user may provide more than one type of cap, e.g., to enable a user to determine how different casings are to be attached to one another.

In some examples, all caps of all casings are male caps 62 (e.g., all casings are similar to casing 60). In such a case, two casings 60 may be attached to one another by hollow connectors, e.g., which, at least in some examples, may be shorter than a typical casing 60, having female threading on its inner surface. Similarly, two casings 64 having female caps 66 may be attached to one another using a male plug with extensions having male threading on their outer surfaces. In some examples, connectors may include bends to enable connection of different casings in a more compact manner than coaxial end-to-end attachment.

Figure 10:
FIG. 10 schematically illustrates an example of a casing of a portable data stack holder that is configured to accommodate two stacks.

FIG. 10 schematically illustrates an example of a casing of a portable data stack holder that is configured to accommodate two stacks.

Double ended casing 70 is configured to enable insertion of two caps 16, e.g., each attached to a stack core 12 and a tile stack 20, into opposite ends. For example, double ended casing 70 may be longer than a typical casing 18, or stack cores 12 (and thus tile stacks 20) may be shorter than (e.g., having about half the length of) double ended casing 70.

Figure 11:
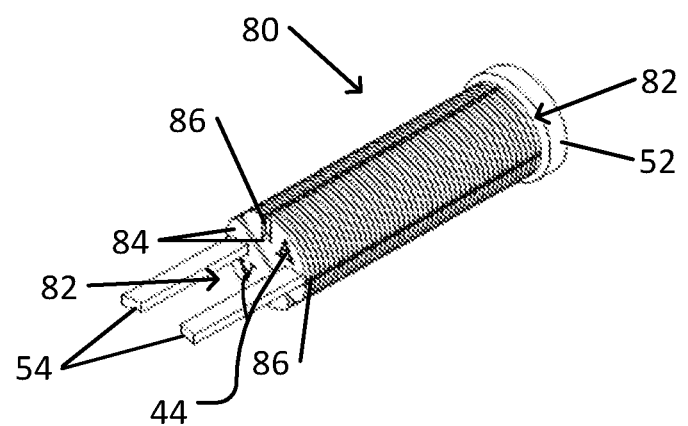
FIG. 11 schematically illustrates an example of a portable data stack holder that is configured to hold different stacks on multiple prongs.

FIG. 11 schematically illustrates an example of a portable data stack holder that is configured to hold different stacks on multiple prongs.

In the example shown, portable data stack holder 80 includes two prongs 54 that extend from cap 52. A stack 82 of tiles 84 may be mounted on each prong 54. In the example shown, each tile 84 of stacks 82 is approximately semicircular and includes a character 44. In this manner, when a stack 82 is mounted on one of prongs 54, tiles 84 of that stack 82 do not prevent mounting of another stack 82 of different tiles 84 on the other prong 54. In the example shown, each tile 84 is provided with two slots 86 e.g., in the form of notches, e.g., to enable tile 84 to be mounted in more than one orientation on prong 54. Closing structure (not shown) may hold tiles 84 on prongs 54. In other examples, a portable data stack holder may include more than two prongs, otherwise shaped tiles, and other types or positions of slots.

Different sets of characters 44 on tiles 84 on different stacks 82 may represent different character strings, or different parts of a single character string. In some cases, tiles 84 that are intended for mounting on different prongs 54 may be produced so as to be distinguishable from one another (e.g., different colors, textures, shapes, character fonts, or otherwise distinguishable).

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A data storage device comprising:
    a plurality of tiles, a face of each tile marked with a character of a set of characters, each tile including a slot;
    an elongated core, a cross section of the core configured to enable a slot of each of the tiles to fit over an openable end of the core to mount that tile on the core, with the marked face of that tile aligned with the face of an adjacent tile that is mounted on the core, and to enable the tile to slide along the core, a length of the core being sufficient such that when a stack of a predetermined maximum number of the tiles is mounted on the core, some of the tiles of the stack are slidable away from other tiles of the stack to form a gap that is sufficiently long to enable reading the character that is marked on that tile;
    a locking element that is placeable on the openable end to prevent removal of a tile of the plurality of tiles from the stack, and removable from the openable end to enable addition of a tile of the plurality of tiles to the stack or removal of a tile of the plurality of tiles from the stack; and
    a casing that is closable over the core and that includes a limiting structure to limit sliding of the tiles along the core when the casing is closed over the core.

2. The device of claim 1, wherein the character is indelibly marked on the face of the tile.

3. The device of claim 2, wherein the character is engraved on the face of the tile.

4. The device of claim 1, where the slot of each tile and the cross section of the core are noncircular.

5. The device of claim 4, wherein the core comprises a single bar.

6. The device of claim 4, wherein the core comprises a plurality of prongs.

7. The device of claim 6, wherein each tile of the plurality of tiles is shaped so as to enable mounting of different stacks of the tiles on different prongs of the plurality of prongs.

8. The device of claim 7, wherein the core comprises two prongs and each tile is substantially semicircular.

9. The device of claim 1, wherein the slot of each tile is located at a center of the face of that tile.

10. The device of claim 1 wherein the slot of each tile is located eccentrically on the face of that tile.

11. The device of claim 1, wherein one end the core that is opposite the openable end is widened at to prevent the tiles from sliding off said one end.

12. The device of claim 11, wherein the locking element comprises a cap into which the openable end is insertable.

13. The device of claim 12, wherein the openable end includes a notch.

14. The device of claim 13, wherein the cap includes a bore such that when the openable end is inserted into that cap such that the notch is aligned with the bore, a screw is insertable into the bore to hold the core to the cap.

15. The device of claim 1, wherein the locking element comprises an end lock, a slot of the end lock being placeable on and removable from the openable end.

16. The device of claim 15, wherein the openable end includes a slit over which the slotted lock is placeable.

17. The device of claim 1, wherein the limiting structure comprises a constriction.

18. The device of claim 1 wherein the limiting structure comprises a spring.

19. The device of claim 1, wherein the core comprises markings.

20. The device of claim 1, wherein the character includes at least one marking selected from a group of types of markings consisting of alphanumeric characters, pictographs, symbols, punctuation marks and diacritical marks.

* * * * *